US011066508B2

(12) United States Patent
Eling et al.

(10) Patent No.: US 11,066,508 B2
(45) Date of Patent: Jul. 20, 2021

(54) POLYESTER-MODIFIED POLYBUTADIENOLS FOR PRODUCING POLYURETHANE ELASTOMERS AND THERMOPLASTIC POLYURETHANES

(71) Applicant: BASF SE, Ludwigshafen (DE)

(72) Inventors: Berend Eling, Lemfoerde (DE); Jan Dilcher, Muehldorf (DE); Irina Fink, Hamburg (DE); Gerrit Luinstra, Hamburg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/504,493

(22) PCT Filed: Aug. 17, 2015

(86) PCT No.: PCT/EP2015/068837
§ 371 (c)(1),
(2) Date: Feb. 16, 2017

(87) PCT Pub. No.: WO2016/026807
PCT Pub. Date: Feb. 25, 2016

(65) Prior Publication Data
US 2017/0240684 A1    Aug. 24, 2017

(30) Foreign Application Priority Data

Aug. 18, 2014 (EP) ..................................... 14181297

(51) Int. Cl.
| | |
|---|---|
| *C08G 18/42* | (2006.01) |
| *C08G 18/62* | (2006.01) |
| *C08G 18/65* | (2006.01) |
| *C08G 18/76* | (2006.01) |
| *C08G 18/32* | (2006.01) |
| *C08G 18/22* | (2006.01) |
| *C08G 18/79* | (2006.01) |
| *C08G 18/63* | (2006.01) |

(52) U.S. Cl.
CPC ....... *C08G 18/4277* (2013.01); *C08G 18/222* (2013.01); *C08G 18/3206* (2013.01); *C08G 18/4269* (2013.01); *C08G 18/6208* (2013.01); *C08G 18/638* (2013.01); *C08G 18/6511* (2013.01); *C08G 18/7671* (2013.01); *C08G 18/797* (2013.01)

(58) Field of Classification Search
CPC ............ C08G 18/4277; C08G 18/4269; C08G 18/638; C08G 18/6208; C08G 18/3206; C08G 18/7671
See application file for complete search history.

(56) References Cited

U.S. PATENT DOCUMENTS

| | | | |
|---|---|---|---|
| 3,965,140 A | 6/1976 | Yoshiaki et al. | |
| 4,190,712 A * | 2/1980 | Flanagan | C08G 18/632 |
| | | | 264/45.5 |
| 4,581,387 A | 4/1986 | Werner et al. | |
| 4,689,357 A * | 8/1987 | Hongu | C08G 18/10 |
| | | | 248/634 |
| 4,764,537 A | 8/1988 | Horn et al. | |
| 5,079,270 A * | 1/1992 | Burkhart | B29C 33/62 |
| | | | 521/115 |
| 5,167,899 A * | 12/1992 | Jezic | C08G 18/6511 |
| | | | 156/167 |
| 5,242,989 A | 9/1993 | Bening et al. | |
| 5,380,886 A | 1/1995 | Daute et al. | |
| 6,111,049 A * | 8/2000 | Sendijarevic | C08G 18/10 |
| | | | 528/59 |
| 2011/0098417 A1* | 4/2011 | Worley | C08G 18/10 |
| | | | 525/328.8 |
| 2015/0119535 A1 | 4/2015 | Shirai et al. | |

FOREIGN PATENT DOCUMENTS

| | | | | |
|---|---|---|---|---|
| DE | 154609 A1 | 4/1982 | | |
| DE | 159775 A1 | 4/1983 | | |
| DE | 160223 A3 | 5/1983 | | |
| DE | 3 607 447 A | 9/1987 | | |
| EP | 153 639 A2 | 9/1985 | | |
| EP | 0240715 A1 | 10/1987 | | |
| EP | 0 266 697 A2 | 5/1988 | | |
| EP | 0 585 265 B1 | 3/1994 | | |
| EP | 1 710 253 B1 | 10/2006 | | |
| EP | 1710263 | * | 10/2006 | ............. C08G 18/69 |
| JP | S-6023418 A | * | 2/1985 | ............. C08G 63/08 |
| JP | 60023418 A | | 6/1985 | |
| JP | 2011046912 A | | 3/2011 | |
| WO | 9219577 A1 | | 11/1992 | |
| WO | 96/20234 A1 | | 7/1996 | |
| WO | 2013180006 A1 | | 12/2013 | |

OTHER PUBLICATIONS

JP-6023418_English Translation Feb. 1985.*
Michael Szycher. Jul. 13, 2012, Structure-Property Relations in Polyurethanes from: Szycher's Handbook of Polyurethanes CRC Press, 41-85 (Year: 2012).*
International Search Report issued in International Application No. PCT/EP2015/068837 dated Sep. 28, 2015.
Fanliang Meng, et al."Nanostructured Thermosetting Blends of Epoxy Resin and Amphiphilic Poly(ε-caprolactone)-block-polybutadiene-block-poly(ε-caprolactone)Triblock CopolymerMacromolecules" 2006, 39, 711-719.
Michael Lemoine, et al. Synthesis of poly(butadiene)poly(ε-caprolactone) multiblocks based on hydroxyl telechelic poly(butadiene): composition and kinetic studye-Polymers, 2009, No. 032.

(Continued)

*Primary Examiner* — Michael L Leonard
(74) *Attorney, Agent, or Firm* — Armstrong Teasdale LLP

(57) ABSTRACT

The invention relates to polyurethanes obtainable by reaction of (a) polyisocyanates A selected from modified or unmodified 4,4'-methanediphenyl diisocyanate, higher nuclear homologs of 4,4'-methanediphenyl diisocyanate, isocyanated groups containing prepolymers based on 4,4'-methanediphenyl diisocyanate, and mixtures thereof, with (b) compounds having at least two isocyanate-reactive hydrogen atoms, comprising (b1) block copolymers formed from a polybutadienol and a cyclic ester as component B1, and (b2) low molecular weight extenders or crosslinkers each having a molecular weight of 62 to 500 g/mol as component B2.

4 Claims, No Drawings

(56) References Cited

OTHER PUBLICATIONS

John P. Consaga et al. "Properties of Hydroxyl-Terminated Polybutadiene-Urethane Systems" J. App. Pol. Sci. 1971, 15, 2941-2956.
C. M. Brunette et al. "Thermal and Mechanical Properties of linear Segmented Polyurethanes with Butadiene Soft Segments" Pol. Eng. Sci. 1981, 21, 668-674.
Jindrich Pytela et al. "Novel Polybutadiene Diols for Thermoplastic Polyurethanes", Technisches Bulletin von Cray Valley (Exton, PA, USA), 4880—Jan. 2010.
J. Howard Bradbury et al., "Advances in the Epoxidation of Unsaturated Polymers" Ind. Eng. Chem. Res. 1988, 27, 2196-2203.
Qing Gao et al. "Synthesis of Low Molecular Distribution Dihydric Polybutadiene in the Presence of Triflic Acid" Journal of Macromolecular Science, Part A: Pure and Applied Chemistry (2013) 50, 297-301.
Günther Oertel, Polyurethane Handbook, 2nd. Edition, 1993, pp. 55-73, Hanser/Gardner Publications, Inc., Cincinnati, USA.
David Randall et al. "The Polyurethanes Book", John Wiley & Sons, Ltd, 2010, Chapters 19 to 22, pp. 285-345.
Milena Spirkova, "Polyurethane Elastomers Made from Linear Polybutadiene Diols" Institute of Macromolecular Chemistry, Academy of Sciences of the Czech Republic, 2001, pp. 84-91, Prague, Czech Republic.

\* cited by examiner

POLYESTER-MODIFIED POLYBUTADIENOLS FOR PRODUCING POLYURETHANE ELASTOMERS AND THERMOPLASTIC POLYURETHANES

CROSS-REFERENCE TO RELATED APPLICATIONS

This application is a U.S. National Phase Application of PCT/EP2015/068837, filed Aug. 17, 2015, which claims the benefit of priority to EP 14181297.4, filed Aug. 18, 2014, the contents of which are hereby expressly incorporated by reference in their entirety.

The present invention relates to the use of block copolymers formed from polybutadienol and a cyclic ester, for example ε-caprolactone, for producing polyurethanes, to the polyurethanes themselves and also to a polyol component comprising said block copolymers.

Liquid hydroxyl-terminated polybutadienes (HTPBs) are well known and are used as polyol components in the production of polyurethanes. Commercially available hydroxyl-terminated polybutadienes are obtained by free-radical polymerization of 1,3-butadiene as described in U.S. Pat. No. 3,965,140, or ionic polymerization of 1,3-butadiene as described in DD 160223. Reagents used to initiate and terminate the production of HTPBs have particular importance. Polyols having differing numbers of functional groups per macromolecule are obtained depending on the production process.

These hydroxyl-terminated polybutadienes are useful as polyol component for producing polyurethane elastomers. A low molecular weight diol extender or a low molecular weight triol crosslinker is typically admixed for the production of polyurethane elastomers as well as the polyol component. Polyurethane elastomers formed from HTPBs and various extenders have been described in various publications, including J. App. Pol. Sci. 1971, 15, 2941-2956; Pol. Eng. Sci. 1981, 21, 668-674; J. App. Pol. Sci, 2002, 85, 84-91. However, HTPBs have not become widely used, and the reason for this is the difficult processing. The difficulties are due to the poor miscibility of these polyols with isocyanates and typical extenders such as 1,4-butanediol. The polyurethane elastomers obtained have inadequate mechanical properties as a result of these incompatibilities. For instance, a technical bulletin from Cray Valley (Exton, Pa., USA), 4880-01/10, "Novel Polybutadiene Diols for Thermoplastic Polyurethanes" says that it is impossible to form a thermoplastic polyurethane (TPU) from Krasol LBH grades, 1,4-butanediol and 4,4'-MDI. Poor compatibility between the raw materials is the stated reason. Molecular weight buildup to adequate levels is apparently impossible because of this poor compatibility. The problem in this case was solved by using more compatible, but atypical extenders for TPUs, for example 2-ethyl-1,3-hexanediol.

EP 1 710 263 B1 discloses a polyurethane rubber obtainable by reaction of
(a) isocyanate prepolymers obtainable by reaction of
  (a-1) isocyanates with
  (a-2) polydienol, with
(b) compounds having isocyanate-reactive groups,
wherein the polydienol admixed during the reaction of components (a) and (b) amounts to more than 15 wt %, based on the overall weight of components (a) and (b). The polydienol (a-2) has terminal OH groups, an OH functionality of 2.0 to 2.6 and a number average molecular weight of 1000 g/mol to 5000 g/mol. Component (b) preferably comprises a polyether polyol (b-1), obtainable by alkoxylating a di-, tri- or tetrafunctional starter molecule; a polytetrahydrofuran (b-2), a polyester polyol (b-3), a polybutadienol (b-4) and also a chain-extending agent (b-5). Also disclosed is the use of the polyurethane rubber as a 2-component adhesive.

The ring-opening polymerization of caprolactone (CL) is known. The use of HTPBs as initiators for preparing block copolymers is described for example in Macromolecules, 2006, 39, 711-719 and e-Polymers, 2009, No. 032. The resultant polyol components having the structure CL-block-HTPB-block-CL are so far not being employed in typical polyurethane uses. A use described in EP 0 266 697 is as a binder for rocket fuels.

JP 6002341 A describes the ring-opening polymerization of lactones by use of polybutadiene polyols as initiators. One example features reaction of polybutadiene polyol with ε-caprolactam in the presence of $Ti(BuO)_4$ as a catalyst. The lactone polymers are stated to be used for producing polyurethane elastomers, foams, adhesives and coatings.

The present invention has for its object to provide a polybutadienol-based polyol component for producing polyurethane elastomers and thermoplastic polyurethanes that is readily compatible with other components. The present invention further has for its object to provide polyurethane elastomers and thermoplastic polyurethanes having very good mechanical properties.

We have found that this object is achieved by polyurethanes obtainable by reaction of
a) polyisocyanates A selected from optionally modified 4,4'-methanediphenyl diisocyanate, higher nuclear homologs of 4,4'-methanediphenyl diisocyanate, isocyanated groups containing prepolymers based on 4,4'-methandiphenyl diisocyanate, and mixtures thereof, with
b) compounds having at least two isocyanate-reactive hydrogen atoms, comprising
  b1) block copolymers formed from a polybutadienol and a cyclic ester as polyol component B1, and
  b2) diols as low molecular weight extenders and optionally triols as crosslinkers having a molecular weight of 62 to 500 g/mol as component B2,
c) optionally further polymeric compounds C having at least 2 isocyanate-reactive hydrogen atoms,
d) optionally catalysts D,
e) optionally water E,
f) optionally physical blowing agents F,
g) optionally further auxiliaries and/or added-substance materials G.

The polyurethanes of the present invention may be polyurethane elastomers (PU elastomers) or thermoplastic elastomers (TPUs), in which case the polyurethane elastomers may also be foams.

Polyurethane elastomers of the present invention are formed from at least a polyol, a extender and a polyisocyanate subject to the proviso that the polyol is a block copolymer formed from a polybutadienol and a cyclic ester. Preferred cyclic esters are ε-caprolactone, 1,6-dioxacyclododecane-7,12-dione (CAS777-95-7) and oxacyclodecan-2-one (CAS 947-05-7).

In one particularly preferable embodiment, the cyclic ester is ε-caprolactone (CL). The polyol component B1 is thus a block copolymer formed from a polybutadienol and ε-caprolactone and having the structure (CL-block-HTPB-block-CL). Polyurethane elastomers based on CL-block-HTPB-block-CL polyols have better mechanical properties than polyurethane elastomers based on hydroxyl-terminated polybutadiene without polyester modifier. Polyurethanes based on polyester-modified HTPB where ε-caprolactone is the polyester modifier are further very hydrophobic, exhibiting water swell values which are very good despite the ester fraction.

The production of thermoplastic elastomers requires the polyester-modified polybutadienols to be difunctional. Suitable polyester-modified polybutadienols B2 for producing TPUs are those based on hydroxyl-terminated polybutadienes (HTPBs) formed by an anionic polymerization proceeding from a difunctional starter, for example 1,4-dilithiumbutane. The preparation of hydroxyl-terminated polybutadienes is described in DD 154609 and DD 159775 for example.

Polyurethane elastomers are also obtainable using polyester-modified polybutadienols having a certain degree of branching. Suitable polybutadienols are formed by controlled free-radical polymerization or by anionic polymerization, or are hydroxyl-modified polybutadienes formed from liquid polybutadienes, for example from products available under the trade name Lithene®, from Synthomer, Essex, UK.

Hydroxyl-modified polybutadienes are obtainable from nonfunctionalized polybutadiene oligomers having in general a number average molecular weight of 500 to 10 000 g/mol, preferably 750 to 7 500 g/mol, more preferably 1000 to 5000 g/mol and especially 1000 to 2000 g/mol. One possible way is to partially epoxidize existing double bonds and then to open these epoxides with suitable nucleophiles. The epoxidation of polydienes is described for example in Perera, Ind. Eng. Chem. Res. 1988, 27, 2196-2203. Polybutadienes may be reacted with polycarboxylic acids to obtain epoxidized products. The polycarboxylic acid may be used directly or formed in situ from the carboxylic acid and hydrogen peroxide. The epoxidation may be performed, for example, using formic acid as the simplest carboxylic acid.

Epoxidized polybutadienes can be converted into hydroxyl-functionalized polybutadienes by means of suitable nucleophiles such as water, alcohols or amines. Alcohols such as ethanol and butanol are preferable. Suitable catalysts for this reaction are strong acids such as mineral acids, as described in EP 0585265 B1, for example, boron trifluoride, as described in U.S. Pat. No. 5,242,989 for example or trifluoromethanesulfonic acid as described in Li, J. Macromol. Sci, Part A, 2013, 50, 297-301 and also WO 96/20234 for example.

Unlike HTPBs formed by anionic or free-radical polymerization, post-functionalized polybutadienols are not selectively hydroxyl terminated, but have hydroxyl groups randomly distributed along the backbone of the polybutadiene.

HTPBs formed by anionic or free-radical polymerization or post-functionalized polybutadienols obtained by epoxidation are subsequently polyester modified by ring-opening copolymerization with a cyclic ester, for example ε-caprolactone, in the presence of a catalyst. The catalysts used are titanium catalysts such as titanium tetrabutoxide, as described in JP-A 60023418.

As crosslinkers or extenders B2 there may be used substances having a molecular weight of 62 to 500 g/mol, more preferably of 62 to 400 g/mol, with extenders having 2 isocyanate-reactive hydrogen atoms and crosslinkers having 3 isocyanate-reactive hydrogen atoms. These may be used individually or preferably as mixtures. It is preferable to use diols and/or triols having molecular weights of less than 500, more preferably of 62 to 400 and especially of 62 to 350. Possibilities include, for example, aliphatic, cycloaliphatic and/or araliphatic or aromatic diols of 2 to 14, preferably 2 to 10 carbon atoms, such as ethylene glycol, 1,2-propanediol, 2-methyl-1,3-propanediol, 1,3-propanediol, 1,4-butanediol, 1,6-hexanediol, 1,10-decanediol and bis(2-hydroxyethyl)hydroquinone, 1,2-dihydroxycyclohexane, 1,3-dihydroxycyclohexane, 1,4-dihydroxycyclohexane, bisphenol A bis(hydroxyethyl ether), diethylene glycol, dipropylene glycol, tripropylene glycol, triols, such as 1,2,4-trihydroxycyclohexane, 1,3,5-trihydroxycyclohexane, glycerol and trimethylolpropane, diethanolamines, triethanolamines, and low molecular weight hydroxyl-containing polyalkylene oxides based on ethylene oxide and/or 1,2-propylene oxide and the aforementioned diols and/or triols as starter molecules. It is particularly preferable for low molecular weight hydroxyl-containing polyalkylene oxides based on ethylene oxide and/or 1,2-propylene oxide, more preferably ethylene, and trifunctional starters, especially glycerol and trimethylolpropane, to be used as crosslinkers B2. Particularly preferable extenders B2 are ethylene glycol, 1,2-propanediol, 1,3-propanediol, 2-methyl-1,3-propanediol, 1,4-butanediol, diethylene glycol and dipropylene glycol.

To produce the polyurethane reaction mixture of the present invention, the organic polyisocyanates A and the components comprising compounds having isocyanate-reactive hydrogen atoms are made to react such that the equivalence ratio of NCO groups to total reactive hydrogen atoms is in the range from 0.5:1 to 3.5:1 (corresponding to an isocyanate index in the range from 50 to 350), preferably from 0.85:1 to 1.30:1 and more preferably in the range from 0.9:1 to 1.15:1.

The optionally modified polyisocyanates A used for producing the polyurethane moldings of the present invention include 4,4'-methanediphenyl diisocyanate mixtures of monomeric 4,4'-methanediphenyl diisocyanates and higher-nuclear homologs of 4,4'-methanediphenyl diisocyanate (polymer MDI). The isocyanates may also be modified isocyanates, for example through incorporation of uretdione, carbamate, isocyanurate, carbodiimide, allophanate and particularly urethane groups. Isocyanate component A may also be used in the form of isocyanate prepolymers comprising isocyanate groups. These polyisocyanate prepolymers are obtainable by reacting the above-described polyisocyanates as component A1, for example at temperatures from 30 to 100° C., preferably at about 80° C., with polyols A2 to form the prepolymer.

Isocyanate groups containing pholymers based on 4,4'-MDI are obtained by reacting optionally modified 4,4'-MDI and/or its higher nuclear homologs with polyols.

Prepolymers are preferably prepared by reacting 4,4'-MDI with uretoneimine-modified MDI and commercially available polyols based on polyesters, proceeding from adipic acid for example, or polyethers, proceeding from ethylene oxide and/or propylene oxide for example.

Polyols A2 are known to a person skilled in the art and are described, for example, in "Kunststoffhandbuch, Volume 7, Polyurethane", Carl Hanser Verlag, 3rd edition 1993, Chapter 3.1. Polyetherols are preferably used as polyols A2. The recited polyols A2 are optionally admixed with customary extenders or crosslinking agents as component A3 to prepare isocyanate prepolymers. Such extenders will hereinbelow be described under B2. Particular preference for use as extenders is given to 1,4-butanediol, 1,2-propylene glycol, 1,3-butanediol, dipropylene glycol, tripropylene glycol and/or propylene glycols having a molecular weight up to 500. The ratio of organic polyisocyanates A1 to polyols A2 and extenders A3 is preferably chosen such that the isocyanate prepolymer has an NCO content of 10 to 28%, more preferably of 14 to 25%.

Block copolymers B1 formed from a polybutadienol and a cyclic ester, preferably ε-caprolactone, that are suitable for preparing polyurethane elastomers generally have a number average molecular weight in the range from 600 to 15 000 g/mol, preferably in the range from 750 to 10 000 g/mol and more preferably in the range from 1000 to 7500 g/mol. Their proportion in the case of ε-caprolactone is generally from 5 to 75 wt %, preferably from 7 to 60 wt % and more preferably from 10 to 50 wt %. Their OH functionality is generally from 2 to 5, preferably from 2 to 3.5 and more preferably from 2 to 3. They generally have not only end-disposed but also chain-disposed OH groups.

Block copolymers B1 formed from a polybutadienol and a cyclic ester, preferably ε-caprolactone, that are suitable for preparing thermoplastic polyurethanes generally have a number average molecular weight in the range from 600 to 15 000 g/mol, preferably in the range from 750 to 10 000 g/mol and more preferably in the range from 1000 to 7500 g/mol. Their proportion of ε-caprolactone is generally from 5 to 75 wt %, preferably from 7 to 60 wt % and more preferably from 10 to 50 wt %. Their OH functionality is generally from 1.5 to 2.2, preferably from 1.8 to 2.2 and more preferably from 1.9 to 2.1. They essentially have exclusively end-disposed OH groups.

The polyurethanes of the present invention are generally obtainable by reaction of
a) 10 to 300 parts by weight, preferably 30 to 150 parts by weight of polyisocyanates A,
b1) 100 parts by weight of polyol component B1,
b2) 2 to 20 parts by weight, preferably 4 to 15 parts by weight of low molecular weight extenders or crosslinkers having a molecular weight of 62 to 500 g/mol as component B2,
c) 0 to 100 parts by weight of further polymeric compounds C having at least 2 isocyanate-reactive hydrogen atoms
d) 0 to 5 parts by weight of catalysts D,
e) 0 to 3 parts by weight of water E
f) 0 to 10 parts by weight of physical blowing agents F
g) 0 to 100 parts by weight of auxiliaries and/or added-substance materials G.

In one embodiment of the present invention, the polyurethanes are noncellular polyurethane elastomers. These are obtainable by reacting components A, B1, B2, optionally C, optionally D and optionally G in the above-specified amounts in the absence of blowing agents E and F.

In a further embodiment of the present invention, the polyurethanes are foams. These are obtainable by reacting components A, B1, B2, optionally C, optionally D and optionally G in the presence of water E as blowing agent and/or of a physical blowing agent F. The reaction is generally carried out in the presence of 0.1 to 10 parts by weight, preferably 0.2 to 5 parts by weight of the physical blowing agent and/or in the presence of 0.05 to 3.0 parts by weight of water, preferably 0.1 to 1.0 part by weight.

The present invention also provides a polyol component comprising
b1) 100 parts by weight of block copolymers formed from a polybutadienol and a cyclic ester, preferably ε-caprolactone, as component B1, and
b2) 2 to 20 parts by weight of low molecular weight extenders or crosslinkers having a molecular weight of 62 to 500 g/mol, preferably 4 to 10 parts by weight, as component B2.

In one preferable embodiment, component B2 comprises ethylene glycol, 1,2-propanediol, 1,3-propanediol, 2-methyl-1,3-propanediol, 1,4-butanediol, diethylene glycol and dipropylene glycol as low molecular weight extender. In one particularly preferable embodiment, component B2 consists of 1,4-butanediol.

In one further preferable embodiment, the crosslinker of component B2 is selected from the group consisting of ethoxylated and/or propoxylated glycerol and trimethylolpropane.

The present invention also provides a method of using a polyol component comprising block copolymers formed from a polybutadienol and a cyclic ester, preferably ε-caprolactone, and a low molecular weight extender or crosslinker having a molecular weight of 62 to 500 g/mol for producing polyurethane elastomers or thermoplastic polyurethanes.

Suitable further polymeric compounds C having at least two isocyanate-reactive hydrogen atoms have a molecular weight of at least 500 g/mol. Any compound having at least two reactive hydrogen atoms and a molecular weight of at least 500 g/mol that is known for polyurethane production may be used. A compound of this type would have a functionality of 2 to 8 and a molecular weight of 500 to 12 000 g/mol for example. It is accordingly possible to use, for example, polyether polyamines and/or polyols selected from the group of polyether polyols, polyester polyols or mixtures thereof.

Further polyols C as are preferably used are polyetherols, polycarbonate polyols and/or polyesterols having molecular weights of 500 to 12 000 g/mol, preferably of 500 to 6000 g/mol, especially of 500 to 3000 g/mol, and preferably having an average functionality of 2 to 6, more preferably 2 to 4. As further polyols C it is preferable to use exclusively polyetherols and/or polyester polyols.

Polyetherols C are prepared according to known methods. For example, they may be prepared by anionic polymerization of alkylene oxides having 2 to 4 carbon atoms with alkali metal hydroxides, for example sodium hydroxide, potassium hydroxide, or alkali metal alkoxides, for example sodium methoxide, sodium ethoxide, potassium ethoxide or potassium isopropoxide, as catalysts and in the presence of at least one starter molecule having from 2 to 8, preferably from 2 to 6, reactive hydrogen atoms, or by cationic polymerization with Lewis acids, such as antimony pentachloride, boron fluoride etherate among others, or fuller's earth as catalysts. Polyether polyols may similarly be prepared from one or more alkylene oxides having 2 to 4 carbon atoms by double metal cyanide catalysis. Tertiary amines may also be employed as a catalyst, examples being triethylamine, tributylamine, trimethylamine, dimethylethanolamine, imidazole or dimethylcyclohexylamine. For specialty applications, monofunctional starters may also be included in the polyether construction.

Suitable alkylene oxides include, for example, tetrahydrofuran, 1,3-propylene oxide, 1,2-butylene oxide, 2,3-butylene oxide, styrene oxide and preferably ethylene oxide and 1,2-propylene oxide. Alkylene oxides may be used singly, alternatingly in succession or as mixtures.

Useful starter molecules include, for example, water, aliphatic and aromatic, optionally N-monoalkyl-, N,N- and N,N'-dialkyl-substituted diamines having 1 to 4 carbon atoms in the alkyl moiety, such as optionally mono- and dialkyl-substituted ethylenediamine, diethylenetriamine, triethylenetetramine, 1,3-propylenediamine, 1,3-butylenediannine, 1,4-butylenediamine, 1,2-hexannethylenediannine, 1,3-hexannethylenediannine, 1,4-hexannethylenediannine, 1,5-hexannethylenediannine, 1,6-hexannethylenediannine, phenylenediamine, 2,3-, 2,4- and 2,6-tolylenediamine (TDA) and 4,4'-, 2,4'- and 2,2'-diaminodiphenylmethane (MDA) and polymeric MDA. Useful starter molecules further include alkanolamines, for example ethanolamine, N-methylethanolamine and N-ethylethanolamine, dialkanolamines, for example diethanolamine, N-methyldiethanolamine and N-ethyldiethanolamine, trialkanolamines, for example triethanolamine, and ammonia. Preference is given to using polyhydric alcohols, such as ethanediol, 1,2-propanediol, 2,3-propanediol, diethylene glycol, dipropylene glycol, 1,4-butanediol, 1,6-hexanediol, glycerol, trimethylolpropane; pentaerythritol, sorbitol and sucrose, and mixtures thereof. Polyether polyols may be used singly or in the form of mixtures.

Useful further polyesterols C include the polyesterols customarily used in polyurethane chemistry. Polyesterols C are obtainable for example from organic dicarboxylic acids having 2 to 12 carbon atoms, preferably aliphatic dicarboxylic acids having 4 to 6 carbon atoms, and polyhydric alcohols, preferably diols, having 2 to 12 carbon atoms, preferably 2 to 6 carbon atoms. Useful dicarboxylic acids include, for example, succinic acid, glutaric acid, adipic acid, suberic acid, azelaic acid, sebacic acid, decanedicarboxylic acid, maleic acid, fumaric acid, phthalic acid, isophthalic acid and terephthalic acid. Dicarboxylic acids here may be used not only singly but also mixed with one another. Instead of the free dicarboxylic acids, it is also possible to use the corresponding dicarboxylic acid derivatives, for example dicarboxylic esters of alcohols having 1 to 4 carbon atoms or dicarboxylic anhydrides. Preference is given to using dicarboxylic acid mixtures of succinic, glutaric and adipic acids in quantitative ratios of, for example, from 20 to 35:35 to 50:20 to 32 parts by weight, and particularly adipic acid. Examples of di- and polyhydric alcohols, particularly diols, are ethanediol, diethylene glycol, 1,2-propanediol, 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol and 1,6-hexanediol. It is further possible to use polyester polyols formed from lactones, e.g., caprolactone, or hydroxy carboxylic acids, for example, hydroxycaproic acid.

Polyester polyols are obtainable by polycondensing organic, e.g., aromatic and preferably aliphatic, polycarboxylic acids and/or derivatives and polyhydric alcohols without a catalyst or, preferably, in the presence of esterification catalysts, advantageously in an atmosphere of inert gas, e.g., nitrogen, carbon monoxide, helium, argon among others, in the melt at temperatures of 150 to 250° C., preferably 180 to 220° C., optionally under reduced pressure, to the desired acid number, which is preferably less than 10 and more preferably less than 2. In one preferred embodiment, the esterification mixture is polycondensed at the abovementioned temperatures to an acid number of 80 to 30, preferably 40 to 30, under atmospheric pressure then under a pressure of less than 500 mbar, preferably 50 to 150 mbar. Useful esterification catalysts include, for example, iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainer materials, e.g., benzene, toluene, xylene or chlorobenzene, to distill off the water of condensation azeotropically. The molar ratio between the organic polycarboxylic acids and/or derivatives and polyhydric alcohols used to form polyester polyols is advantageously in the range from 1:1 to 1.8, preferably in the range from 1:1.05 to 1.2.

The polyester polyols obtained preferably have a functionality of 2 to 4, especially of 2 to 3, and a number average molecular weight of 480 to 3000, preferably 1000 to 3000 g/mol.

When catalysts D are used for preparing the polyurethanes, they are preferably compounds and have a substantial hastening effect on the reaction of the hydroxyl-containing compounds of component B and optionally C with the organic, optionally modified polyisocyanates A. Examples include amidines, such as 2,3-dimethyl-3,4,5,6-tetrahydropyrimidine, tertiary amines, such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo(3,3,0)octane and preferably 1,4-diazabicyclo(2,2,2)octane and alkanolamine compounds, such as triethanolamine, triisopropanolamine, N-methyldiethanolamine, and N-ethyldiethanolamine and dimethylethanolamine. Also to be considered are organometallic compounds, preferably organic tin compounds, such as tin(II) salts of organic carboxylic acids, e.g., tin(II) acetate, tin(II) octoate, tin(II) ethylhexoate and tin(II) laurate, and the dialkyltin(IV) salts of organic carboxylic acids, e.g., dibutyltin diacetate, dibutyltin dilaurate, dibutyltin maleate and dioctyltin diacetate, and also bismuth carboxylates, such as bismuth(III) neodecanoate, bismuth 2-ethylhexanoate and bismuth octanoate or mixtures thereof. Organometallic compounds may be used alone or preferably in combination with strong basic amines.

The amount of catalyst or catalyst combination used is preferably from 0.001 to 5 wt % and especially from 0.05 to 2 wt %, based on the overall weight of components B and optionally C.

The polyurethane elastomers may be noncellular, compact materials having a density of generally greater than 1000 kg/m$^3$, or foams. Foams are preferably produced by blowing with water (component E) which reacts with isocyanate groups by evolution of carbon dioxide. So-called physical blowing agents may also be used in combination with or in lieu of water. Physical blowing agents are inert toward the feedstock components, usually liquid at room temperature and vaporized under the conditions of the urethane reaction. Their boiling point is preferably below 100° C.

Physical blowing agents F are usually selected from the group consisting of alkanes and/or cycloalkanes having at least 4 carbon atoms, dialkyl ethers, esters, alcohols, ketones, acetals, fluoroalkanes having 1 to 8 carbon atoms and tetraalkylsilanes.

Examples include propane, n-butane, isobutane, cyclobutane, n-pentane, isopentane, cyclopentane, cyclohexane, dimethyl ether, methyl ethyl ether, methyl butyl ether, methyl formate, tertiary butanol, acetone and also fluoroalkanes which are broken down in the troposphere and are therefore harmless for the ozone layer, such as trifluoromethane, difluoromethane, 1,1,1,3,3-pentafluorobutane, 1,1,1,3,3-pentafluoropropane, 1,1,1,2,3-pentafluoropropene, 1-chloro-3,3,3-trifluoropropene, 1,1,1,2-tetrafluoroethane, difluoroethane and 1,1,1,2,3,3,3-heptafluoropropane and also perfluoroalkanes, such as $C_3F_8$, $C_4F_{10}$, $C_5F_{12}$, $C_6F_{14}$, and $C_7F_{17}$. Particular preference is given to hydrocarbons, preferably pentanes, specifically cyclopentane. The recited physical blowing agents may be used alone or in any desired combinations with one another.

When water is used as sole blowing agent, the amount of water is preferably in the range from 0.05 to 3 parts by weight, based on the polyol components B and optionally C. When a physical blowing agent is used, the amount thereof is preferably in the range from 0.1 to 10 parts by weight, based on the polyol components B and optionally C.

Foams are generally produced in a mold. Foam density is generally in the range from 100 to 1000 kg/m³. Foams of this type are sometimes referred to as microcellular foams in the technical literature.

The reaction mixture for producing polyurethane foams may optionally also be admixed with auxiliaries and/or added-substance materials E. Examples of auxiliaries and/or added-substance materials E include surface-active substances, foam stabilizers, cell regulators, further release agents, fillers, dyes, pigments, hydrolysis control agents, flame retardants, odor-absorbing substances and fungistatic and/or bacteriostatically active substances.

Useful surface-active substances include for example compounds which serve to augment the homogenization of the starting materials and are possibly also suitable for regulating the cell structure. Examples are emulsifiers, such as the sodium salts of castor oil sulfates or of fatty acids, and also salts of fatty acids with amines, e.g., diethylamine oleate, diethanolamine stearate, diethanolamine ricinoleate, salts of sulfonic acids, for example alkali metal or ammonium salts of dodecylbenzene- or dinaphthylmethanedisulfonic acid, and ricinoleic acid; foam stabilizers, such as siloxane-oxalkylene interpolymers, and other organopolysiloxanes, ethoxylated alkylphenols, ethoxylated fatty alcohols, paraffin oils, castor oil esters or, to be more precise, ricinoleic esters, Turkey red oil and peanut oil, and cell regulators, such as paraffins, fatty alcohols and dimethylpolysiloxanes. To improve the emulsifying effect, the cell structure and/or stabilization of the foam it is further possible to use oligomeric acrylates having polyoxyalkylene and fluoroalkane moieties as side groups. Surface-active substances are typically used in amounts of 0.01 to 5 parts by weight, based on 100 parts by weight of component B and optionally C.

Useful further release agents include for example: reaction products of fatty acid esters with polyisocyanates, salts of amino-containing polysiloxanes and fatty acids, salts of saturated or unsaturated (cyclo) aliphatic carboxylic acids having at least 8 carbon atoms and tertiary amines and also, more particularly, inner release agents, such as carboxylic esters and/or amides prepared by esterifying or amidating a mixture of montanic acid and at least one aliphatic carboxylic acid having at least 10 carbon atoms with at least difunctional alkanolamines, polyols and/or polyamines having molecular weights of 60 to 400 g/mol, as disclosed in EP 153 639 for example, mixtures of organic amines, metal salts of stearic acid and organic mono- and/or dicarboxylic acids or anhydrides, as disclosed in DE-A-3 607 447 for example, or mixtures of an imino compound, the metal salt of a carboxylic acid and optionally a carboxylic acid, as disclosed in U.S. Pat. No. 4,764,537 for example. Preferably, reaction mixtures according to the present invention do not contain any further release agents.

Useful fillers, especially reinforcing fillers, include the customary, familiar organic and inorganic fillers, reinforcing agents, weighting agents, coating agents, and so on. Specific examples are inorganic fillers such as silicatic minerals, for example sheet-silicates, such as antigorite, bentonite, serpentine, horn blends, amphibols, chrisotile and talc, metal oxides, such as kaolin, aluminum oxides, titanium oxides, zinc oxide and iron oxides, metal salts such as chalk and barite, and inorganic pigments, such as cadmium sulfide, zinc sulfide, and also glass among others. Preference is given to using kaolin (china clay), aluminum silicate and coprecipitates of barium sulfate and aluminum silicate. Inorganic fibers may also be added, glass fibers for example. Useful organic fillers include for example carbon black, melamine, rosin, cyclopentadienyl resins and graft polymers and also cellulose fibers, polyamide fibers, polyacrylonitrile fibers, polyurethane fibers, polyester fibers based on aromatic and/or aliphatic dicarboxylic esters, and especially carbon fibers.

Organic and inorganic fillers may be used singly or as mixtures and are advantageously added to the reaction mixture in amounts of 0.5 to 50 wt %, preferably 1 to 40 wt %, based on the weight of components A to D.

The polyurethanes thus obtained have various possible uses. The main fields of use are described in "The Polyurethanes Book", Randall and Lee (editors), Wiley, 2010, ISBN 978-0-470-85041-1, Chapters 19 to 22.

Thermoplastic urethanes are meltable polyurethanes processed in conventional thermoplastic processing operations such as extrusion, calendering and injection molding for example into film/sheet, hoses, cable sheathing and high-value component parts for the vehicle industry.

Microcellular polyurethane elastomers are used, for example, in footwear and in overload springs and integral foams for the automotive industry.

Castable polyurethane elastomers are used, for example, for producing rollers, sieves, filters, industrial flooring and sports floors.

RIM elastomers are used, for example, in disk and window beading and for producing automotive components, such as fenders and spoilers.

Polyurethane elastomers may be used to produce elastomeric coatings.

Polyurethane elastomers may be used to produce elastomeric fibers.

Polyurethane elastomers may be used to produce adhesives.

The examples which follow illustrate the invention.

EXAMPLES

Table 1 shows an overview of possible polyols based on polybutadiene. Polyol 4 is a post-functionalized polybutadiene. Table 1 further lists a purely polycaprolactone polyester (Capa® 2200, Perstorp Holding, Perstorp, Sweden) as polyol 5.

Example 1

Preparation of Polyol 4

In a conical 10 L steel reactor, 680 g of Lithene® PM4 (from Synthomer, Essex, UK) were dissolved in 3850 g of toluene and heated to 60° C. Following addition of 59.5 g of 98 wt % formic acid the contents were intimately mixed at 400 rpm. Hydrogen peroxide was added at a weight of 40 mL/h continuously over 7.5 hours. The reaction mixture was then washed twice with saturated sodium bicarbonate solution and once with saturated sodium chloride solution.

The organic phase was dried with sodium sulfate and the solvent was removed at 60° C. under reduced pressure.

Conversion of double bonds: 6.9%; epoxy value after Jung & Kleeberg: 0.104 mol of epoxy/100 g of polymer; color: pale yellow; viscosity: 0.687 Pa·s (40° C.)

In a 6 L glass reactor, 520 g of the epoxidized Lithene® PM4 were dispersed in 2080 g of 1-propanol and heated to 65° C. Following addition of 1.56 mL of a 10 wt % solution of trifluoromethanesulfonic acid in 1-propanol (100 ppm), the contents were stirred for 6 hours. The mixture was neutralized in sodium bicarbonate, cooled down and filtered. The propanol was removed from the filtrate at up to 95° C. under reduced pressure.

OH number: 52.11; color: pale yellow; viscosity: 1.09 Pa·s (40° C.)

Further polyols used are described in Table 1.

TABLE 1

| Designation | Polyol 1 | Polyol 2 | Polyol 3 | Polyol 4 | Polyol 5 |
|---|---|---|---|---|---|
| Polybutadienol | Krasol ® LBH P2000 | Krasol ® LBH P3000 | PolyBD R45 HTLO | Hydroxylated Lithene ® PM4 | (Capa ® 2200) |
| Molar mass Mn (manufacturer data) | 1978 | 2975 | 2800 | 2600 | 2000 |
| Functionality (manufacturer data) | >1.9 | >1.9 | 2.4-2.6 | 2.4 | 2 |
| ε-Caprolactone [wt %] | 0 | 0 | 0 | 0 | 100 |
| OH number | 53.82 | 34.98 | 52.49 | 52.11 | 54-58 |
| η [Pa · s] (at temperature) | 2.75 (40° C.) | 4.62 (40° C.) | 1.31 (60° C.) | 1.09 (40° C.) | 0.48 (60° C.) |
| Tm [° C.] | amorphous | amorphous | amorphous | amorphous | 40-50 |

Krasol ® and PolyBD polyols are manufactured by Cray Valley, an affiliate of Total, France.

Preparation of polyester-modified polyol components

ε-Caprolactone was dried over $CaH_2$ and then distilled at 130° C. under reduced pressure, stored at –30° C. under argon and used within 14 days. Titanium tetrabutoxide was dissolved in dry toluene at 50% by volume, and the solution was stored under argon.

Example 2

Preparation of Polyols 6 to 10

The polybutadiene used was dried at 95° C. in vacuo for 20 hours and stored under argon before use. A 250 mL glass reactor was filled with 164 g of polyol 1 (157 mmol of OH groups) and 36 g of ε-caprolactone (315 mmol) and flushed with argon. The components were stirred homogeneous, heated to 120° C. and finally admixed with 43 μL of titanium tetrabutoxide solution (15 ppm of titanium) before the reactor was sealed. Following 2 hours of stirring at 120° C., the product was discharged.

Polyols 7 to 10 in Table 2a were prepared similarly to polyol 6. Initial weight differences and related product properties are summarized in Table 2a.

TABLE 2a

Preparation of ester-modified polyol components

| Designation | Polyol 6 | Polyol 7 | Polyol 8 | Polyol 9 | Polyol 10 |
|---|---|---|---|---|---|
| Polybutadienol | Polyol 1 | Polyol 1 | Polyol 2 | Polyol 2 | Polyol 4 |
| Monomer/OH | 2 | 5 | 2 | 5 | 2.4 |
| Proportion of ε-caprolactone [wt %] | 18 | 35 | 13 | 26 | 20 |
| Polybutadiene [g] | 164.1 | 129.2 | 175.1 | 147.5 | 175.9 |
| ε-Caprolactone [g] | 35.9 | 70.8 | 24.9 | 52.5 | 132.0 |
| Ti [ppm] | 15 | 30 | 11 | 22 | 150 |
| Reaction temperature [° C.] | 120 | 120 | 120 | 120 | 150 |
| Reaction time [h] | 2 | 2 | 2 | 2 | 8 |
| OH number | 44.84 | 35.41 | 33.26 | 28.38 | 40.77 |
| η [Pa · s] at 40° C. | 2.33 | 2.62 | 4.4 | 4.97 | 1.03 |
| Tm [° C.] | amorphous | amorphous | amorphous | 22.7 | 48.3 |

Example 3

Preparation of Polyols 11 to 13

In a 5 L steel reactor, 1367.4 g of polyol 3 (1.28 mol of OH groups) were dried at 100° C. in vacuo for 3 hours and admixed with 462.7 g of ε-caprolactone (4.06 mol) under nitrogen. The components were stirred homogeneous at 250 rpm and 150° C. before 0.40 ml of titanium tetrabutoxide solution (15 ppm of titanium) was admixed and the reactor was sealed. Following 4 hours of stirring at 150° C., the product was discharged.

Polyols 12 and 13 in Table 2b were prepared similarly to polyol 11. Initial weight differences and related product properties are summarized in Table 2b.

TABLE 2b

Preparation of ester-modified polyol components

| Designation | Polyol 11 | Polyol 12 | Polyol 13 |
|---|---|---|---|
| Polybutadienol | Polyol 3 | Polyol 3 | Polyol 1 |
| Monomer/OH | 1.6 | 3.20 | 4 |
| Proportion of ε-caprolactone [wt %] | 15 | 25 | 30 |
| Polybutadiene [g] | 1700 | 1367.4 | 2454.6 |
| ε-Caprolactone [g] | 287.5 | 462.7 | 1058.2 |
| Ti [ppm] | 15 | 15 | 3 |
| Reaction temperature [° C.] | 150 | 150 | 120 |
| Reaction time [h] | 4 | 4 | 4 |
| OHv | 41 | 38 | 34 |
| Visco [Pa · s] at 60° C. | 1.54 | 1.87 | 10.94 |
| Tm [° C.] | amorphous | 14.9 | amorphous |

Production of Polyurethane Elastomers

Polyol component and isocyanates were temperature controlled to 45° C. and/or 60° C. for processing into polyurethanes. The temperature depended on the melting temperature of the polyol component. The polyol component aside from the polybutadiene polyol comprised 1,4-butanediol as extender, mercury salt as catalyst and a defoamer (Antifoam MSA, from Dow Corning). The B component used was a mixture formed from equal parts of a commercially available 4,4'-MDI-based prepolymer having an NCO value of 23% (MP102 from BASF) and a commercially available uretoneimine-modified 4,4'-MDI (MM103 from BASF). The formulations for the polyurethane elastomers were all adjusted to an NCO index of 100. One mixing pass involved the components being mixed in a Speedmixer from Hausschild at 2000 rpm for one minute.

Example 4

Production of Elastomers 1 to 11

Instancing the production of elastomer 2, 90.07 g of polyol 6 (95.2% of the polyol component) were weighed into a beaker for the polyol component together with 3.79 g of 1,4-butanediol (4.0% of the polyol component), 0.47 g of catalyst (0.5% of the polyol component) and 0.28 g of defoamer (0.3% of the polyol component) and temperature controlled for 30 minutes to 45° C. (processing temperature). This component was mixed in a Speedmixer for 2 minutes until bubble free. The isocyanate component was then admixed for one minute in the Speedmixer. The mixture was poured out into a 150×200×2 mm$^3$ mold temperature controlled to 80° C. and smoothed down with a plastics rod. After 30 minutes the cast elastomer was demolded and conditioned at 80° C. for 4 hours. The polyurethane elastomer was stored for at least 7 days at 23° C. and 50% relative humidity before characterization.

Elastomers 1 and 3 to 11 were obtained similarly to elastomer 2. Initial weight differences and related product properties of the elastomers obtained on the basis of other HTPB polyols are summarized in Tables 3a and 3b according to the processing temperature.

TABLE 3a

Production of polyurethane elastomers from unmodified polyols at processing temperature of 45° C.

| | Designation | | | | | |
|---|---|---|---|---|---|---|
| Polybutadiene type | Elastomer 1 Polyol 1 | Elastomer 2 Polyol 6 | Elastomer 3 Polyol 7 | Elastomer 4 Polyol 2 | Elastomer 5 Polyol 8 | Elastomer 6 Polyol 9 |
| ε-Caprolactone in polyol [wt %] | 0 | 18 | 35 | 0 | 13 | 26 |
| Polyol [%] | 95.2 | 95.2 | 95.2 | 95.2 | 95.2 | 95.2 |
| Butanediol [%] | 4 | 4 | 4 | 4 | 4 | 4 |
| Defoamer [%] | 0.3 | 0.3 | 0.3 | 0.3 | 0.3 | 0.3 |
| Catalyst [%] | 0.5 | 0.5 | 0.5 | 0.5 | 0.5 | 0.5 |
| Shore A | 58 | 70 | 69 | 61 | 70 | 69 |
| Elongation at break [%] | 409 | 550 | 641 | 322 | 379 | 497 |
| Tensile strength [MPa] | 11.1 | 25.0 | 23.6 | 6.31 | 14.2 | 16.2 |
| Degree of swelling [%] | 0.29 | 0.35 | 0.42 | 0.26 | 0.27 | 0.30 |

TABLE 3b

Production of polyurethane elastomers from ester-modified polyols at processing temperature of 60° C.

| Designation | Elastomer 7 | Elastomer 8 | Elastomer 9 | Elastomer 10 | Elastomer 11 |
|---|---|---|---|---|---|
| Polyol | Polyol 3 | Polyol 11 | Polyol12 | Polyol 4 | Polyol 10 |
| ε-Caprolactone in polyol [wt %] | 0 | 15 | 25 | 0 | 20 |
| Polyol [%] | 93.6 | 93.6 | 93.6 | 95.6 | 95.6 |
| Butanediol [%] | 6 | 6 | 6 | 4 | 4 |
| Defoamer [%] | 0.3 | 0.3 | 0.3 | 0.3 | 0.3 |
| Catalyst [%] | 0.1 | 0.1 | 0.1 | 0.1 | 0.1 |
| Shore A | 72 | 71 | 78 | 42 | 39 |
| Elongation at break [%] | 95.6 | 232.6 | 257.9 | 81 | 104 |
| Tensile strength [MPa] | 4.057 | 11.32 | 11.62 | 1.5 | 2.5 |
| Degree of swelling [%] | 0.46 | 0.41 | 0.39 | 0.64 | 0.4 |

Comparative Example 1

Production of Elastomer 12

A polyurethane elastomer was formed from a purely polycaprolactone polyol (polyol 5 in Table 1) in accordance with Example 4 for comparison. Table 4 summarizes the elastomer's formulation and mechanical properties.

TABLE 4

Production of polyurethane elastomer from purely polycaprolactone at processing temperature of 60° C.

| Designation | Elastomer 12 |
|---|---|
| Polyol | Polyol 5 |
| ε-Caprolactone in polyol [wt %] | 100 |
| Polyol [%] | 95.6 |
| Butanediol [%] | 4 |
| Defoamer [%] | 0.3 |
| Catalyst [%] | 0.1 |
| Shore A | 58 |
| Elongation at break [%] | 470 |
| Tensile strength [MPa] | 30 |
| Degree of swelling [%] | 1.39 |

The examples provided show that the grafting of polybutadienols with blocks of polycaprolactone leads to a distinct improvement in mechanical properties. The degrees of swelling of the polyurethane elastomers in water are further very low, the modification with caprolactone notwithstanding.

Example 5

Production of TPU 1

Polyol component 13 and the isocyanate were temperature controlled to 70° C. and 45° C., respectively, for processing into a thermoplastic polyurethane (TPU). The polyol component aside from the polybutadiene polyol comprises 1,4-butanediol as extender. The isocyanate component used was 4,4-MDI. The formulation was adjusted to an NCO index of 100.

Mixing was performed with an overhead stirrer from Heidolph at 220 rpm.

The polyol component was provided by weighing 1420.11 g of polyol 13 (91.27% of the polyol component) into a tub together with 124.48 g of 1,4-butanediol (8.0% of the polyol component) followed by storage at 70° C. for 2 hours. This was followed by the addition of 444.06 g of pure 4,4'-MDI. The components were mixed until the reaction mixture had reached 80° C. The material was then poured into an aluminum shell temperature controlled to 80° C. After altogether 10 minutes, the TPU was conditioned at 80° C. for 15 hours.

Preparation of Test Specimens

The TPU obtained was cut into pieces about 15×10 cm² in size, which were cooled with liquid nitrogen. The cooled samples were comminuted with a Condux chopper into pellets. The pellets were used on the Babyplast (model 6/10) from Christmann Kunststofftechnik GmbH to form test specimens 3 cm×7 cm in size by injection molding (plastification 211° C., crosshead chamber 215° C., die 210° C., mold 64° C.). S2 shoulder bars were subsequently cut out. The mechanical properties are summarized in Table 5.

TABLE 5

Production of TPU from ester-modified polyol

| Designation | TPU 1 |
|---|---|
| Polyol | Polyol 13 |
| ε-Caprolactone in polyol [wt %] | 30 |
| Polyol [%] | 91.27 |
| Butanediol [%] | 8 |
| Shore A | 75 |
| Elongation at break [%] | 471.7 |
| Tensile strength [MPa] | 13.3 |
| Degree of swelling [%] | 0.45 |

Comparative Example 2

Producing a TPU from an Unmodified Polybutadienediol

An experiment similar to Example 5 with an unmodified polybutadienediol, polyol 1, lead to a material of very low strength. The material was not further processed.

Characterization

Conversions of double bonds in the epoxidation of polybutadienes were determined by $^1$H NMR spectroscopy in d-chloroform. EP values of epoxidized polybutadienes were determined by a method of Jung & Kleeberg [Fres. J. Anal. Chem. 1962, 387].

OH numbers of polyols were determined to DIN 53240-2 by potentiometric titration.

Dynamic shear viscosities were determined with an AR-G2 rheometer from TA Instruments. The measurements were carried out at the stated temperature in the steady state mode at shear frequencies between 0.1 and 1000 Hz using a cone-plate geometry (diameter: 40 mm or 60 mm, angle: 2°).

Melting temperatures were determined by DSC. The sample was heated from room temperature to 150° C. at a rate of 20° C./min. The temperature was maintained for 3 min. The temperature was finally cooled down to −120° C. at a rate of 10° C./min before heating after a delay time of 3 min to 220° C. at 10° C./min. The melting points were determined during the second heating phase. The temperature was again maintained for 3 min before finally cooling down to room temperature.

Tensile tests were carried out to DIN 53504 before S2 shoulder bars with optical path tracking.

Shore hardnesses were determined to DIN 53505.

Water imbibition was determined on PU plaques about 3×4 cm² in size, cut to fit slide frames. The samples were placed in 100° C. water for 5 hours. The samples were finally dabbed dry before the degree of swelling was computed from the weight difference.

We claim:

1. A polyurethane obtainable by reaction of:
   a) 30 to 150 parts by weight of polyisocyanates A selected from the group consisting of modified 4,4'-methanediphenyl diisocyanate, unmodified 4,4'-methanediphenyl diisocyanate, higher nuclear homologs of 4,4'-methanediphenyl diisocyanate, isocyanate groups containing prepolymers based on 4,4'-methanediphenyl diisocyanate and polyetherols, and mixtures thereof,
   b1) 100 parts by weight of block copolymers formed from a polybutadienol and a cyclic ester as component B1,
   b2) 4 to 15 parts by weight of at least one of diols as low molecular weight extenders and triols as crosslinkers, each having a molecular weight of 62 to 500 g/mol as component B2,
   c) 0 to 100 parts by weight of polymeric compounds C having at least 2 isocyanate-reactive hydrogen atoms, selected from the group consisting of polyetherols, polycarbonate, polyols and polyesterols having a molecular weight of 500 to 12,000 g/mol and an average functionality of 2 to 6,
d) 0 to 5 parts by weight of catalysts D,
e) 0 to 3 parts by weight of water E,
f) 0 to 10 parts by weight of physical blowing agents F, and
g) 0 to 100 parts by weight of auxiliaries, added-substance materials, and mixtures thereof as component G, selected from the group consisting of surface-active substances, foam stabilizers, cell regulators, release agents, fillers, dyes, pigments, hydrolysis control agents, flame retardants, odor-absorbent substances, fungistatically active substances and bacteriostatically active substances;
wherein the polyisocyanates A are reacted with a mixture of components b1), b2) and optionally one or more of components c), d), e), f), and g),
wherein the polyol component B1 has a number average molecular weight in the range from 600 to 15,000 g/mol, an ε-caprolactone fraction of from 10 to 50 wt. %, and an OH functionality of 1.5 to 2.2, and
wherein the extender of component B2 is 1,4-butanediol.

2. The polyurethane according to claim 1, wherein the cyclic ester is selected from the group consisting of ε-caprolactone, 1,6-dioxacyclododecane-7,12-dione and oxacyclodecan-2-one.

3. The polyurethane according to claim 1, wherein the crosslinker of component B2 is selected from the group consisting of ethoxylated glycerol, propoxylated glycerol, mixtures thereof, and trimethylolpropane.

4. The polyurethane according to claim 1, wherein a) includes 30 to 150 parts by weight of polyisocyanates A selected from the group consisting of modified 4,4'-methane diphenyldiisocyanate, unmodified 4,4'-methanediphenyl diisocyanate, higher nuclear homologs of 4,4'-methanediphenyl diisocyanate and mixtures thereof.

* * * * *